3,575,952
TALL OIL RECOVERY

Charles W. Morris, Jacksonville, and Gerald S. Watkins, Apalachicola, Fla., assignors to SCM Corporation, Cleveland, Ohio
Filed Oct. 2, 1969, Ser. No. 863,774
Int. Cl. C09f 1/02
U.S. Cl. 260—97.7                                13 Claims

ABSTRACT OF THE DISCLOSURE

A process for removing lignin salts from crude tall oil soap skimmings is disclosed. The soap skimmings are washed or extracted with an aqueous salt solution. In the preferred embodiment the salt solution is the aqueous alkalized "spent acid" from the crude tall oil acidulation reaction. This extraction reduces the lignin concentration in the lignin concentration in the soap skimming phase and thereby promotes a better yield and better quality of crude tall oil upon acidulation. A viscosity controlled phase separation technique is employed in separating the viscous soap skimmings from the less viscous aqueous washing liquors.

---

This invention relates to an improved method for purifying crude tall oil soap skimmings in the process for recovering crude tall oil from soap skimmings.

It has been known for years that certain woods, especially those designated as pine, contain fatty acids and rosin acids in various combinations. In the digestion of woodpulp in an alkaline cooking liquor these rosin acids and fatty acids remains in the cooking liquor as soaps. The alkaline cooking liquor mass is known as black liquor and the fatty acid and rosin acid soaps are known as crude tall oil soap.

The black liquor, from which tall oil is eventually obtained, is an aqueous solution separated from the cellulosic portion of the wood in the manufacturing of paper pulp by alkaline processes and it contains, among other things, sodium sulfate, sodium sulfide, sodium phenates, sodium salts of lignin material (lignates), fatty acid soaps, rosin soaps and unsaponifiable organic compounds. When the black liquor is concentrated to recover the alkaline digesting components, a large proportion of the soaps will separate from the aqueous phase and float on the liquor as an amorphous viscous layer containing a small amount (i.e., 5% by weight) of physically entrained or occluded black liquor. This occluded black liquor cannot be separated from the soap by ordinary centrifugal or gravimetric separation techniques and remains as part of the soap "skimmings."

The recovery of crude tall oil from tall oil soap skimmings is accomplished by adding sufficient acid (usually sulfuric acid) to convert the fatty acid soaps and rosin acid soaps to the free fatty acid and rosin acid. Heretofore, the soaps and the organic acids obtained therefrom have often been of poor quality and yield because of contamination with lignin. Apparently, the presence of lignin inhibits the recovery of the acids from the soaps through the formation of interfacial emulsions upon acidulation and also promotes the formation of pitch and other undesirable by-products in the subsequent distilaltion of tall oil products from crude tall oil.

The occluded black liquor, of course, contains dissolved lignates which promote the formation of an interfacial emulsion layer between the crude tall oil and the aqueous phase upon acidulation. Apparently, the lignate salts are converted to lignin upon acidulation and the lignin forms an emulsion at the interface of the crude tall oil and the spent acid aqueous phase. This emulsion makes the separation of the tall oil from the aqueous phase very difficult and results in crude tall oil losses.

In the conventional process the acidulation is accomplished by adding sulfuric acid to soap skimmings with the injection of steam to heat the mixture, and agitating until the mixture is acidified to a pH of about 5 or lower. The reaction mixture is then separated into two phases by centrifugation, decantation, etc. and the crude tall oil is removed as the lighter phase.

In the past various attempts have been made to prevent the formation of this emulsion phase upon acidulation.

For instance, U.S. Patent 2,133,345 shows it is common practice to wash the soap skimmings with spent acid (having a pH of about 3–5) from the acidulation process to remove as much of the occluded black liquor as possible. Otherwise, the lignin content therein is precipitated upon acidulation to form a bulky precipitate which causes substantial loss of crude tall oil and sulfuric acid.

U.S. Patent 2,296,952 shows the treatment of alkaline crude tall soap solutions under non-oxidizing conditions with a caustic brine solution to separate the phenolic and lignin components from the soaps by "graining out" or "salting out" the soap. The washings are then separated from the soap by gravity.

U.S. Patent 2,227,203 shows the purification of crude tall oil soaps by completely saponifying the soaps in an alkaline solution equivalent to a caustic soda content of about 5 to 10% concentration to effect a precipitation of soap from the aqueous phase and extraction of lignin and other undesired constituents into the caustic soda solution. This method involves the technique of "graining" or "salting out" of the crude taill oil soaps from alkaline solutions. A similar process is described in the article appearing in the "Paper Mill News," May 28, 1955, at page 16 wherein purified soap is "grained" or "salted out" of a caustic solution by the addition of electrolytes.

In all of these prior processes where extraction is carried out, the heavier aqueous extract phase is separated from the lighter tall oil soap skimming raffinate phase by gravity (decantation) or assisted gravity (centrifugation). Considerable difficulty is often encountered in making this phase separation due to too small of a density differential between the phases or the presence of an interfacial emulsion layer. It has now been discovered that these prior art gravity and assisted gravity phase separation processes can be performed more efficiently by controlling the phase separation through the viscosity differential between the phases. Preferably the aqueous phase is the spent acid from the crude tall oil acidulation reaction that has been made basic to a pH of at least about 8.

According to the present invention, lignate salts are removed from the tall oil soap skimmings by extraction with an aqueous salt solution. In this extraction process the heavier, less viscous, aqueous extract phase is removed as the underflow by gravity or assisted gravity and the viscous, less dense tall oil soap skimmings raffinate phase is removed as the overflow from a phase separation chamber. The interface between the underflow and overflow is maintained within the separation chamber by regulating the removal rate of underflow in response to the position of the interface within the separation chamber as determined by monitoring the viscosity gradient across the interface. This prevents the removal of raffinate in the underflow.

The aqueous salt solution can be acid (i.e., having a pH below 7), as disclosed in U.S. Patent 2,143,345 in column 2 or the aqueous salt solution can be neutral or basic at a pH above 7 as disclosed in U.S. Patent 2,296,952 on page 1. The salt can be any water soluble salt that is not reactive with the crude tall oil soap.

Suitable salts include alkali and alkaline earth halides and sulfates such as KCl, $Na_2SO_4$, $CaCl_2$, etc. In either of these processes, the lignin content of the tall oil soap skimmings phase is reduced by extraction in the aqueous phase in accordance with the teaching of these patents. The teaching of U.S. Patents 2,296,952; 2,227,203 and 2,143,345 is hereby incorporated by reference. The use of a salt solution is essential to obtain an aqueous phase specific gravity in excess of 1, so as to increase the density differential between the aqueous phase and the lighter soap phase. Also, the presence of the dissolved salt in the aqueous solution minimizes the solubility of the soap skimmings phase in the aqueous phase and thus prevents unnecessary losses through interphase solubility.

In one preferred embodiment of the present invention the aqueous solution is the spent acid from the crude tall oil acidulation reaction which has been made basic to a pH of 8 or above with a suitable base.

This preferred embodiment is based on the principle that the lignin present in the soap as sodium lignate salt dissolved in the occluded black liquor is soluble at a pH of 8 and above. It is only upon acidulation that lignin is precipitated and forms an emulsion and readily physically combines with and emulsifies the crude tall oil in the proportion to the amount of lignin present. When the phase separation is accomplished, crude tall oil is lost with the interphase emulsion. It is therefore desirable to remove as much of the black liquor from the soap skimmings prior to acidulation since the lignin is present in the black liquor. It is also desirable to remove as much of the lignates from the occluded black liquor in the soap skimmings.

Crude tall oil soap skimmings after a phase separation from the black liquor contain a certain amount of physically occluded or entrained black liquor. The proportion varies from mill to mill and usually the soap skimmings contain about 1% to about 20% by weight of occluded black liquor. In normal pulp-mill operations the black liquor can be reduced to 10% by weight (or less) of the overall soap skimmings by centrifuging, decanting and other conventional gravimetric separation techniques. In this black liquor is dissolved lignin as sodium lignate generally to a concentration of about 5% to about 30% of the black liquor. The lignate concentration of the overall soap skimmings usually amounts to about 0.5% to about 2% by weight. Upon subsequent acidification the dissolved sodium lignate precipitates as a lignin amorphous residue and forms an interfacial emulsion layer between the aqueous acid phase and the crude tall oil phase. This interfacial emulsion layer entrains oil and a clean separation of the crude tall oil from the aqueous acid phase cannot be attained. It is common to lose 10% or more of the available crude tall oil with this interfacial emulsion layer. (This is further explained with respect to FIG. 2.) Removal of the lignin as a sodium lignate salt before acidification reduces this loss of tall oil appreciably.

It has now been discovered that the lignate salts dissolve in the black liquor occluded in the crude tall soap skimmings can be diluted and removed by extracting or washing the crude tall soap with spent aqueous acid from the acidulation reaction, which has been alkalized to a pH of at least about 8 and preferably 10–14. The term alkalized is used herein according to its conventional meaning (i.e., an excess of hydroxyl ions in aqueous solutions). The black liquor which is physically occluded on the crude tall oil soap (that black liquor which cannot be removed by conventional phase separation techniques such as decantation and centrifugation) is normally about 5% by weight of the overall soap skimmings, although as much as 10–20% by weight has been encountered in some paper mills. Occluded black liquor typically contains about 10–25% lignin as dissolved lignate salts. This usually amounts to about 0.5–1.2% by weight of the overall soap skimmings. It is, of course, desirable to minimize the amount of black liquor present by removing all of the free or non-occluded black liquor before treating the soap according to the present invention.

The present preferred method for removing lignin as sodium lignate is to wash or extract the soap with the spent aqueous phase from the crude tall oil soap acidulation process which has been made alkaline to a pH of 8 or higher with a suitable base such as an alkali metal hydroxide (e.g., sodium hydroxide, potassium hydroxide, etc.). As a matter of convenience the spent aqueous acid phase from the acidulation reaction which has been made alkaline to a pH of 8 or higher will be referred to herein as "alkaline washing liquor." The black liquor occluded in the soap is washed by and replaced with an alkaline medium which contains no lignin and therefore the amount of lignin in the soap is reduced in proportion to the extent of the washing or extraction. The alkaline washing liquor, of course, contains little or no lignin.

The spent acid from the crude tall oil acidulation is an aqueous solution having a pH of about 3–5. The spent acid conventionally is sulfuric acid for economy and efficiency although other mineral acid such as hydrochloric or nitric can be employed if desired. The sulfuric acid used for acidulation is usually about 90–95% by weight of $H_2SO_4$ in water to minimize the volume of water that must be handled. Furthermore, the concentrated acid results in a high concentration of salt in the spent acid phase which increases the specific gravity of the alkaline washing liquors upon alkalization.

Upon alkalization of the spent acid to form the alkaline washing liquors, salt is formed from the reaction between the acid and the neutralizing base. When sodium hydroxide is used the resulting alkaline washing liquors contain about 15–30% by weight of dissolved salt (mostly $Na_2SO_4$), have a specific gravity of about 1.05–1.4, a viscosity of about 1 centipoise and a pH of 8 or higher while the crude tall oil soap skimmings have a specific gravity of 0.9–1 and a viscosity of about 2,000–8,000 centipoises.

After washing the soap with the alkaline washing liquor the aqueous phase is removed by a phase separation and the lignin concentration of the soap is materially reduced.

The present process mixes the soap and alkaline washing liquor together in a mixing vessel equipped with a high shear agitator to form an intimate physical mixture of the soap and alkaline washing liquors. The mixture then passes to a separation chamber such as a horizontal tank having one or more bottom outlets for withdrawing the alkaline washing liquor. This separation can be accomplished by centrifugation although a gravimetric separation using a viscosity probe to detect the interface is preferred for efficiency and economy, because the soap is quite viscous and difficult to separate from the alkaline washing liquors. According to the preferred technique the interface between the soap and the alkaline washing liquor is sensed by one or more viscosity probes and then controlled within a pre-set range by automatically removing the heavier and less viscous aqueous phase. The separation chamber can be pressurized if desired to provide for more efficient handling of the viscous soap phase.

The present invention will be more fully understood by reference to the drawings wherein.

Figure 1:
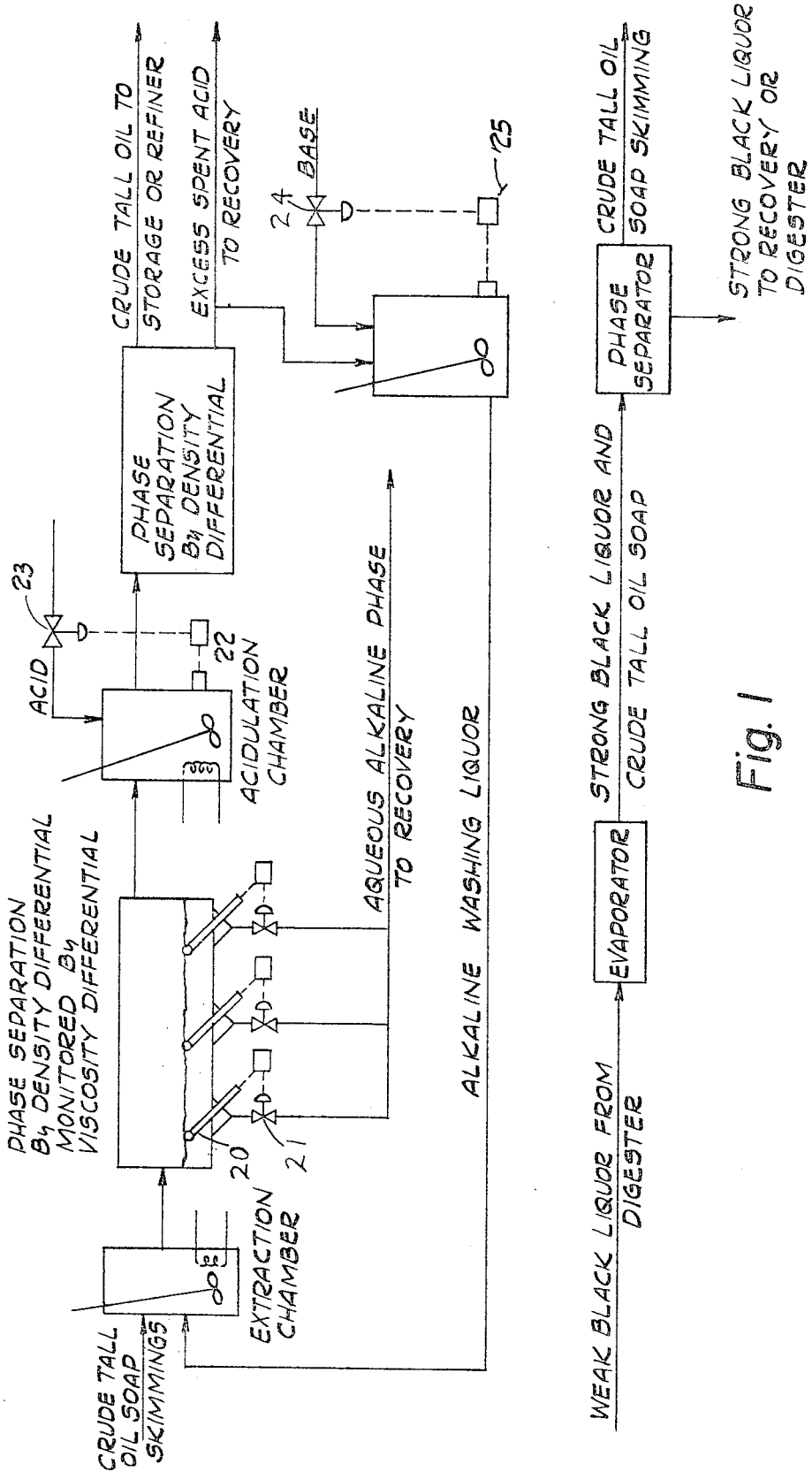
FIG. 1 is a process schematic diagram illustrating one embodiment of the present invention.

Referring now to FIG. 1, weak black liquor from a digester (not shown) passes through an evaporator where water is removed and the black liquor concentrated to form a strong black liquor phase with a viscous mass of crude tall oil soap floating thereon. The crude tall oil soap is separated from the strong black liquor in a phase separator by decantation or centrifugation and the strong black liquor is returned to the digester or processed for recovery.

The crude tall oil soap skimmings have a specific gravity of about 0.9–0.95 and contain about 5% occluded black liquor and the equivalent of 58% crude tall oil. The occluded black liquor contains about 20% by weight of dissolved lignate salts (so the overall soap skimmings contain about 1% by weight of lignates). The soap skimmings pass to an extraction chamber equipped with a high shear mixer wherein the skimmings are thoroughly mixed with alkaline washing liquors in the ratio of 1 part by weight washing liquors to 1 part by weight of soap skimmings. The alkaline washing liquor is an aqueous solution having a pH of about 12–13, a specific gravity of about 1.2, a viscosity of about 1 centipoise, and containing about 25% dissolved $Na_2SO_4$. The amount of alkaline washing liquors used to wash the soap skimmings varies depending upon the overall lignate content of the soap skimmings. For optimum crude tall oil recovery the amount of alkaline washing liquor is calculated to dilute the lignate content to no more than about 0.1% by weight of the overall soap skimmings. This washing ratio results in the dilution of the lignate concentration in the occluded black liquor to about 0.05% by weight of the overall soap skimmings under equilibrium conditions. This is determined by the following conventional extraction calculations:

100 parts of soap skimmings containing
    95 parts of soap, and
    5 parts of occluded black liquor.
The occluded black liquor contains 20% lignates (the equivalent of one part by weight of the soap skimmings).

Upon dilution with 100 parts of lignin free alkaline washing liquors the results at equilibrium are as follows:

95 parts of soap,
105 parts of aqueous liquors containing one part by weight of lignates.

Upon separation the results were as follows:

100 parts of soap skimmings containing
    95 parts of soap, and
    5 parts occluded liquors; and
    100 parts of aqueous liquors.

The occluded liquors contain only 5/105 parts of lignates or about 0.048 part lignates per 100 parts of soap skimmings. As a practical matter equilibrium conditions are not usually reached although lignate concentrations of 0.08–0.1% of the overall soap skimmings are realized by the technique.

It is apparent to those skilled in the art that the extraction or washing can be accomplished in a countercurrent or cocurrent extraction process conducted in as many stages as are practical. Various recycle schemes are also obvious. The single stage extraction process set forth above is merely illustrative. Other suitable extraction schemes are disclosed in Section 11 of the "Chemical Engineer's Handbook" (3rd edition) edited by J. H. Perry, McGraw-Hill Book Company, Inc., 1950. The lignate content should be reduced as low as possible to optimize the crude tall oil recovery upon acidulation. A lignate concentration of 0.1% is practical from a commercial standpoint.

Figure 2:
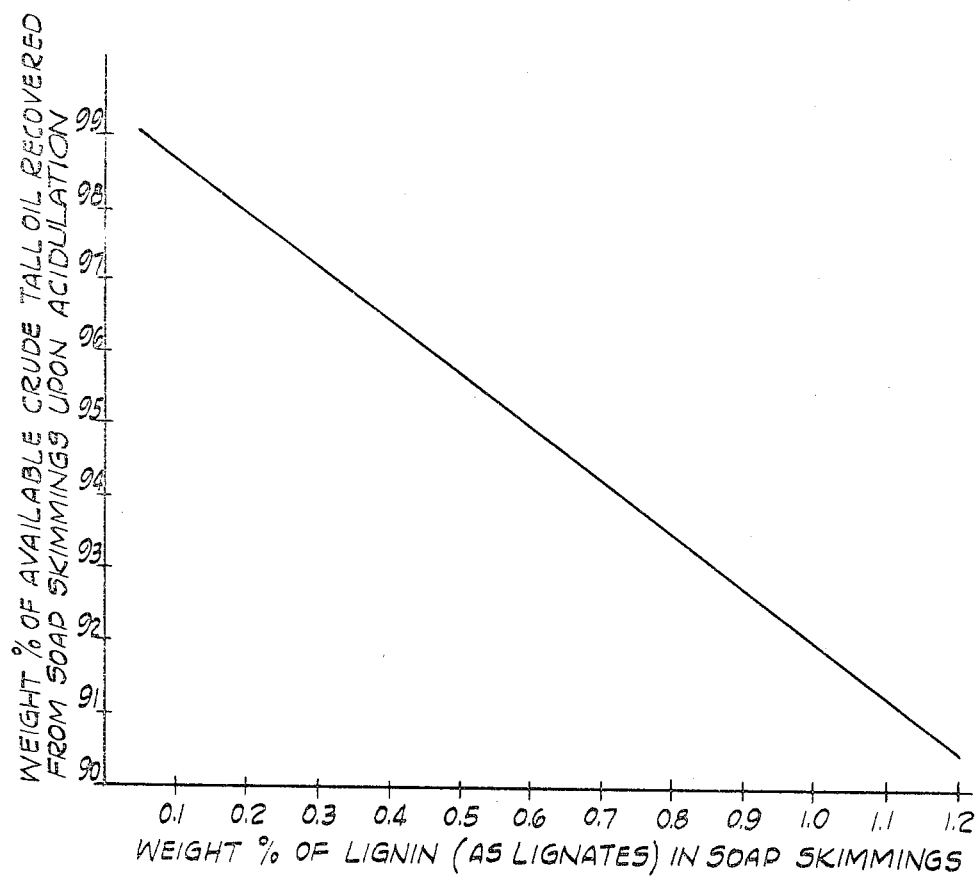
FIG. 2 is a graph illustrating the yield of crude tall oil from soap skimmings as a function of the lignin content of the soap skimmings.

FIG. 2 shows how the lignin content of the soap skimmings influences the recovery of crude tall oil according to the present invention. For optimum recovery the lignin content is reduced to 0.1% or less of the soap skimmings.

The mixture in the extraction chamber can be heated to above room temperature by a suitable heating means (such as a steam coil or live steam) to reduce the viscosity of the soap while being agitated to provide intimate contact between the alkaline washing liquors and the soap skimmings. Usually, the washing is conducted at temperatures not substantially in excess of 100° F. to minimize the soap solubility in the washing liquors. Washing temperatures of 70° F. to 100° F. are common. The residence time in the mixing chamber is about 15–30 minutes to approach equilibrium.

The two-phase mixture in the mixing chamber then passes to a phase separation chamber where the soap skimmings are separated from the alkaline washing liquors. This phase separation can be accomplished in the usual manner such as by decantation or centrifugation although it has been found that separation using the viscosity differential between the two phases as a monitor or control is particularly effective. The phase separation chamber is shown in the drawing as being equipped with viscosity probes.

The washed soap skimmings have a viscosity in the neighborhood of about 4,000 centipoises while the alkaline washing liquor has a viscosity of about 1 centipoise.

As shown in FIG. 1, several viscosity probes 20 are present in the phase separation chamber to detect the interface of the soap skimmings and the alkaline washing liquors. The phase separation chamber can be pressurized (i.e., 1–30 p.s.i.g.) to optimize separation and provide for efficient handling of the soap skimmings. A commercially available viscosity probe is Consistency Probe Transmitter, Model 715T sold by the Taylor Instrument Company. This probe features a spindle turning in the measured liquid with a load sensing device on the motor which indicates the viscosity of the liquid. These viscosity probes actuate control valves 21 which discharge the aqueous alkaline phase containing dissolved lignin to a conventional recovery process not shown.

The viscosity probes 20 are positioned at stationary points within the phase separation chamber and measure the viscosity of the liquid phase in contact therewith. This viscosity measurement is translated into an electrical signal which is proportional to the measured viscosity. This electrical signal from the probe actuates the control valves 21 through controllers illustrated schematically in FIG. 1. The controllers are set to open valves 21 when the viscosity probes are in contact with the less viscous aqueous underflow extract phase having a viscosity of about 1 centipoise. The valves 21 remain open until the viscosity probes contact the more viscous soap skimmings overflow raffinate phase having a viscosity of about 4,000 centipoises. The valves 21 then close and the interfacial region between the soap skimmings phase and the aqueous alkaline extract phase is maintained in the vicinity of (e.g., slightly below) the point of viscosity measurement. The valves 21 continue to open and close in response to the viscosity measurement as the two phases flow through the separation chamber and are separated.

Similarly, the separation chamber can be in the form of a centrifuge or other "assisted gravity" separation device as described in U.S. Pat. 2,227,203. When a centrifuge is used the control valve is positioned in the underflow or overflow effluent lines (or both) and the viscosity probe is positioned within the centrifuge at the zone of interfacial separation. Alternatively, the viscosity probe can be placed in the underflow or overflow effluent live and operate in response to the presence of underflow in the overflow line, or overflow in the underflow line. Accordingly, the term "underflow" as used herein refers to the more dense or heavier stream leaving a phase separation chamber and the term "overflow" refers to the less dense or lighter stream leaving the separation chamber.

The viscous soap skimmings leave the chamber as the overflow phase and pass to an acidulation chamber. The acidulation chamber is equipped with a mixer and a pH control cell 22 which actuates the control valve 23 to introduce acid into the chamber. The acidulation chamber is also equipped with a live steam line or other suitable heating means to raise the temperature of the acidulation to about 150–210° F. to obtain efficient reaction. The mass is acidulated to a pH of about 3.5 or lower to spring the fatty acids and rosin acids from the acidulation mass. While any mineral acid such as hydrochloric acid or nitric acid can be used for the acidulation, sulfuric acid is preferred for efficiency and economy. Preferably, concentrated sulfuric acid (i.e., 90–95% by weight $H_2SO_4$) is used to minimize the amount of water introduced into the acidulation reaction and thereby maximizing the density of the resulting spent acid phase to promote efficient phase separation.

The acidulation mass then passes to a second phase separation chamber such as a centrifuge or decanter where the crude tall oil is separated as the light phase and passes to storage. About 99% of the available crude tall oil is recovered from the soap skimmings.

The spent acid underflow phase is separated and passes to an alkalization where the pH is raised to about 12–13 by the addition of a base (e.g., NaOH) through control valve 24 under the control of a pH cell 25. This alkalized spent acid is the alkaline washing liquor used to wash additional soap skimmings to remove the lignin. The excess spent acid is sent to recovery. During the start-up of the process alkaline washing liquors from previous operations can be employed. If no alkaline washing liquors are available, a caustic salt solution having a composition similar to the alkaline washing liquors can be used until sufficient alkaline washing liquors are generated by the process.

It is apparent from the above that the washing or extraction of the soap skimmings with the alkaline washing liquors can be conducted in several steps rather than just one step to obtain the desired degree of purification.

The primary advantage of this invention is that the phase separation of the crude tall oil from the excess spent acid is very clean since there is no lignin present to promote the interphase emulsions during the phase separation after acidulation. Most of the lignin present in the soap skimmings leaves the process with the aqueous alkaline phase.

As an additional advantage of the present invention the fractionation of tall oil products from the crude tall oil results in the formation of less "bottoms" or residue. In fractioning the crude tall oil produced in this example, the following product yields were obtained:

|   | Percent |
|---|---|
| Rosin | 33.5 |
| Distilled tall oil | 13.0 |
| Fatty acids | 25 |
| Heads | 9 |
| Pitch (bottoms or residue) | 15 |
| Loss | 2.5 |

Conventionally recovered crude tall oil usually fractionates to leave about 16–22% pitch (bottoms) at the expense of the useful components.

From the foregoing it is apparent that a novel method for improving the yield of crude tall oil from soap skimmings is provided. Additionally, this novel recovery method unexpectedly results in improved yield of tall oil distillation products upon fractionation.

Having thus described the invention, what is claimed is:

1. In the process for removing lignin and lignate salts from crude tall oil soap skimmings by extraction with an aqueous salt solution wherein a volume of said crude tall oil soap skimmings are intimately contacted with a volume of said aqueous salt solution; the resulting extraction mixture separated in a separating zone into a viscous, light, crude tall oil soap skimmings raffinate phase and a less viscous, denser, aqueous extract phase by the density differential between phases; the phase boundaries defining an interfacial region therebetween; and the raffinate phase is removed as the overflow from said separation zone and the extract phase is removed as the underflow from said separation zone; the improvement which comprises the steps of;

establishing a viscosity measurement point within said separation zone, measuring the viscosity of the phase which is present at said measurement point, and regulating the removal rate of underflow in response to said phase viscosity measurement by sufficiently restricting the removal rate of said underflow when the viscosity measurement indicates that the viscous raffinate phase is present at said measurement point to thereby maintain the raffinate phase boundary in the vicinity of said measurement point and prevent the removal of raffinate phase with the underflow.

2. The process of claim 1 wherein said aqueous salt solution has a pH of at least about 7.

3. The process of claim 1 wherein said aqueous salt solution has a pH below 7.

4. In the process for recovering crude tall oil from crude tall oil soap skimmings containing occluded black liquor, said black liquor containing dissolved lignate salts wherein said soap skimmings are acidulated with an aqueous acid to produce a crude tall oil phase and a spent aqueous acid phase, and said crude tall oil is separated from said spent acid phase, the improvement which comprises purifying said soap skimmings prior to acidulation to reduce the concentration of dissolved lignate salts in any aqueous phase remaining occluded in the soap skimmings through the steps of;

(a) alkalizing at least a portion of said spent acid phase to a pH of about 8;

(b) extracting lignate salts from said crude tall oil soap skimmings with said alkalized spent acid by intimately contacting a volume of said soap skimmings with a volume of said alkalized spent acid;

(c) separating the resulting extraction mixture in a separating zone into a viscous, light, crude tall oil soap skimmings raffinate phase and a less viscous, denser, alkalized spent acid extract phase by the density differential between the phases, the phase boundaries defining an interfacial region therebetween;

(d) establishing a viscosity measurement point within said separation zone;

(e) measuirng the viscosity of the phase which is present at said measurement point;

(f) removing raffinate phase as the overflow from said separation zone and removing extract phase as the underflow phase from said separation zone;

(g) regulating the removal rate of underflow in response to said viscosity measurement by sufficiently restricting the removal rate of said underflow when the viscosity measurement indicates that the viscous raffinate phase is present at said measurement point to thereby maintain the raffinate phase boundaries in the vicinity of said measurement point and prevent the removal of raffinate with the underflow.

5. The process of claim 4 wherein said soap skimmings initially contain about 1–20% by weight of occluded black liquor.

6. The process of claim 5 wherein said black liquor initially contains about 5–30% of dissolved lignate salts.

7. The process of claim 4 wherein the lignate salts are initially in the proportion of about 0.5 to about 2% by weight of the soap skimmings.

8. The process of claim 4 wherein said spent acid phase is alkalized to a pH of about 10–14.

9. The process of claim 2 wherein said acid is concentrated sulfuric acid.

10. The process of claim 2 wherein said base is an alkali metal hydroxide.

11. The process of claim 10 wherein said alkali metal hydroxide is sodium hydroxide.

12. The process of claim 4 wherein said soap skimmings are extracted with alkalized spent acid in a proportion sufficient to reduce the lignate salt content of the soap skimmings from about 0.05% to about 0.5% by weight.

13. The process of claim 12 wherein said lignate salt content is reduced to about 0.1% by weight.

References Cited

UNITED STATES PATENTS

| | | | |
|---|---|---|---|
| 2,143,345 | 1/1939 | Frankel et al. | 260—97.6 |
| 2,227,203 | 12/1940 | Scott et al. | 260—97.7 |
| 2,296,952 | 9/1942 | Ross et al. | 260—97.6 |

DONALD E. CZAJA, Primary Examiner

W. E. PARKER, Assistant Examiner

U.S. Cl. X.R.

260—97.6